June 21, 1960 L. E. EARLING 2,942,104
LOW VOLTAGE TRANSISTORIZED SIGNAL SEEKING TUNER
Filed Sept. 30, 1957
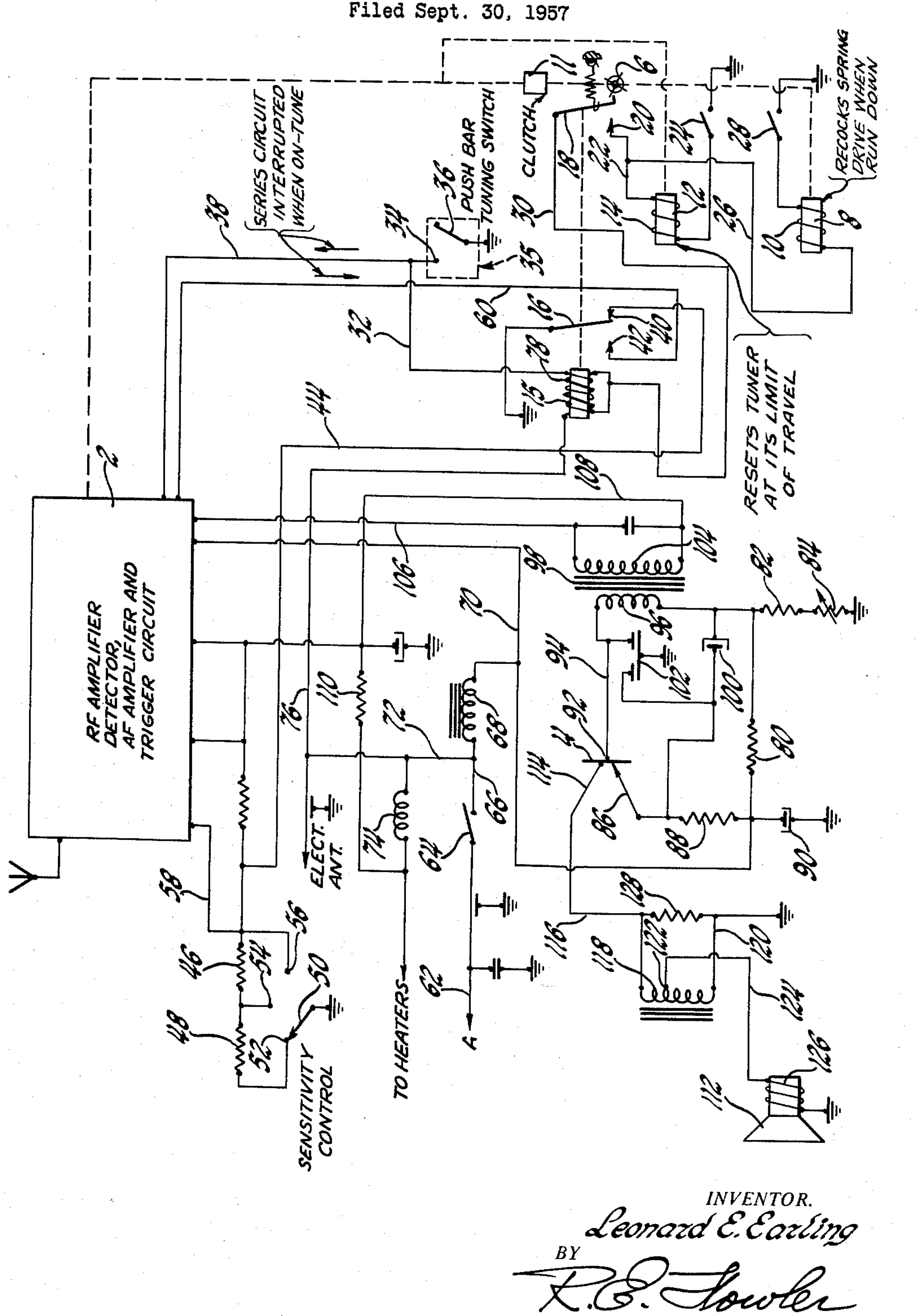
INVENTOR.
Leonard E. Earling
BY
R. B. Fowler
ATTORNEY 2,942,104
Patented June 21, 1960

2,942,104

LOW VOLTAGE TRANSISTORIZED SIGNAL SEEKING TUNER

Leonard E. Earling, Galveston, Ind., assignor to General Motors Corporation, Detroit, Mich., a corporation of Delaware Filed Sept. 30, 1957, Ser. No. 687,191

4 Claims. (Cl. 250—20)

This invention relates to radio receiving apparatus and more particularly to radio receivers which are automatically indexed or stopped on station by the receipt of an incoming signal. These receivers have been called "signal seeking" or "signal tuned" radio devices. In general, these signal seeking radio receivers are indexed upon the receipt of a modulated carrier wave through the energization or deenergization of relay means to cause power driven tuning means to stop. There are, of course, many ways in which means for tuning the receiver may be driven over the spectrum for which the particular apparatus is designed. In the current structure the movable means for tuning the radio receiver is driven in one direction by a power storage means such as a spring and returned to the opposite extreme position by an electrical solenoid which quickly pulls the tuner to its opposite position upon the closure of a limit switch.

Since other means than the signal seeking automatic means is used for tuning the radio apparatus, such for example as manual or mechanical push button means, are also provided, the signal seeking control means must be capable of being de-coupled from the tuning means so that other means may operate or move it. Since this is the case, the tuning means may reach one end of its travel when the spring driving motor is only partially discharged and does not need recocking and vice versa, the spring may become discharged and need repowering in some instances when the tuner is remote from the point of movement to its opposite extreme. Since this is the case, two different solenoids are provided, one to move the tuning means from one extremity to the other and a second to independently recock the spring for the power driving means. Both of these solenoids are independently energizable by limit switches and may be energized at any time that they are needed. Such a tuning means in general is disclosed in a co-pending application S.N. 570,604 in the names of George M. Gaskill and Manfred G. Wright filed March 9, 1956 which issued as Patent No. 2,852,944 on September 23, 1958. The control relay which is actuated upon the receipt of a signal by the apparatus is energized during periods of tuning and deenergized to mechanically index the tuning means on station. The cocking or powering solenoids are quite strong and when energized produce vibration and jar in the tuner. Under some circumstances this has caused the relay to erroneously drop its contacts and index the apparatus where no station exists.

It is therefore an object in making this invention to provide auxiliary means for maintaining said control relay energized until a signal is received even though the set may be jarred by extraneous vibration or solenoid operation.

It is a further object in making this invention to provide means for assuring that the control relay will not erroneously index the set.

With these and other objects in view which will become apparent as the specification proceeds, the invention will be best understood by reference to the following specification and claims and the illustrations of the accompanying drawings in which:

The figure is a circuit diagram of a receiver embodying my invention.

Referring specifically to the figure, there is shown therein a radio receiver of a superheterodyne type, the main portion of which is shown in block diagram form at 2 and labelled "RF Amplifier, Detector, AF Amplifier and Trigger Circuit." The majority of the audio amplifier is contained in the block 2 but the final stage which incorporates a power transistor 4 is shown together with its specific circuitry. As previously stated, this is a signal seeking or signal tuned receiver and as such is provided with power driving means diagrammatically shown at 6 to cause the tuning means within the block diagram 2 to move repetitively back and forth across the spectrum. The driving means 6 includes a spring for causing the tuner to move from one end of the frequency band to the other when the spring is loaded and requires a solenoid for repowering the spring or recharging the same when it has reached its discharged end. In this instance the solenoid for cocking the spring is shown at 8 as indicated by the dash line and includes the energizing winding 10.

Mechanically connected directly to the movable tuning means is a member which moves therewith and which can be moved either by the power driving means 6 when clutched thereto or by other manual or mechanical preset means (not shown). This member may be referred to as a treadle bar and is in general merely a movable member mechanically linked directly to the tuning means. As explained above, since the power driving means is coupled or de-coupled from the treadle bar by a means such as 11, a separate means is necessary which can independently move the treadle bar to its extreme position so that it can then be again driven by the power driving means 6. Such a repositioning solenoid is shown at 12 and includes the winding 14. The solenoid 12 is shown diagrammatically coupled directly to the tuning means through the dash line which joins the dash line from the power driving means beyond the clutch.

In signal tuned radio receivers a stopping or indexing signal is generated in a trigger circuit also shown in the block 2. In this type of apparatus when a signal is tuned in the main relay coil 15 is deenergized and drops its armatures 16 and 18 which are mechanically coupled together but electrically insulated from each other. The movement of the armature 18 to its deenergized position causes mechanical interference with a part driven by the spring motor 6 to cause the same to stop and lock the tuning means on station. Armature 18 also acts as a switch arm in its attracted position where it engages stationary contact 20 to provide desired switching. Stationary contact 20 is connected through line 22 to one terminal of the solenoid winding 14, the opposite terminal of which is connected through limit switch 24 to ground. Limit switch 24 is a normally open switch and is only closed at the forward limit of movement by the treadle bar mechanically connected to the tuner. Stationary contact 20 is also connected through line 26 with one terminal of winding 10, the other terminal of which is connected through a limit switch 28 to ground. Limit switch 28 is normally open and is momentarily closed when the spring motor 6 powering the movement of the tuner in one direction reaches a certain discharged condition. Armature 18 is electrically connected through line 30 to one terminal of relay coil 15, the opposite terminal of which is connected through line 32 to stationary contact 34 of an initiating switch 35. Contact 34 cooperates with movable switch arm 36 which is grounded. Line 32 is also connected through tieline 38 with the trigger circuit within the set from which it receives its control indexing pulse.

The second armature 16 which is actuated by the relay coil 15 oscillates between two fixed contacts 40 and 42 to provide other control features. Contact 40 is connected through line 44 with the cathode string of the amplifier and is adapted to change the sensitivity of the latter depending upon the condition of the circuit. Line 44 is therefore connected in the cathode string to one terminal of a pair of resistances 46 and 48 which are connected in series. A sensitivity control switch arm 50, which is grounded, is adapted to contact stationary contacts 52, 54 and 56 in order to insert in circuit between the cathodes and ground, differing amounts of resistance. Contact 52 is directly connected to the remote terminal of resistance 48, contact 54 to a point intermediate the two resistors 46 and 48 and contact 56 directly to the cathode line 58 and of course to the line 44. Thus by moving arm 50, the sensitivity of the amplifier during tuning may be determined. This enables the operator to adjust the set to stop on only strong stations or on many stations. It is to be noted that armature 16 of the main control relay, which is grounded, engages stationary contact 40 when the relay coil 14 is deenergized, causing all of these resistances to be shorted out and they do not affect the sensitivity of the amplifier when on station or listening. The remaining stationary contact 42 associated with movable armature 16 is connected through line 60 to the trigger circuit in the block 2 and completes an energizing circuit therefore when the device is tuning.

The power supply for the receiver is obtained through the A lead 62 and a main off-on switch 64 which is connected to line 66. Line 66 is in turn connected to one terminal of a filter choke coil 68. This applies filtered power to power line 70 and thence to the main system in block 2. Line 66 is likewise coupled to tieline 72 and thence through choke 74 to the heaters for the various electron tubes in the set. Line 72 is also connected to tieline 76 for supplying power to the electrical antenna associated with the set. Line 76 is further connected to one terminal of an auxiliary winding 78 on the relay. This winding is provided to prevent chattering of the relay contacts due to vibrations produced from extraneous sources or from the operation of either solenoid by energization of the windings 14 or 10. The remaining terminal of the auxiliary winding 78 is connected to line 30. Power line 70 is connected to ground through a voltage divider consisting of resistances 80, 82 and 84. The latter resistance 84 is variable and can be adjusted. This voltage divider provides the necessary bias voltages for the last audio amplifier stage including transistor 4. The emitter electrode 86 of the transistor 4 is connected through limiting resistor 88 to line 70 and the common connection of line 70 and resistance 88 is connected to ground through a bypass condenser 90. The base electrode 92 of the transistor 4 is connected directly through line 94 to one terminal of the secondary winding 96 of the audio transformer 98. The remaining terminal of the secondary winding 96 is connected directly to a point between the resistances 80 and 82 in the voltage divider.

A compensating condenser 100 is connected directly between the emitter 86 and one terminal of the secondary 96. Capacitance means 102 is likewise connected across between the line 94 and the emitter 86. The primary winding 104 of the audio transformer 98 has one terminal connected through line 106 to the audio output of the preceding stage and the opposite terminal connected through line 108 and limiting resistor 110 to one of the power lines. Thus the output is applied to the primary from the preceding stages. The output of the final power amplifier is applied to the loud speaker 112 where it is translated into sound waves. This is accomplished through the connection from the collector electrode 114 through line 116 to one end of an auto transformer coil 118. The opposite end of the coil 118 is connected to ground through line 120 and an intermediate tap 122 of the coil is connected through line 124 to the one terminal of the voice coil 126 on the speaker, the opposite terminal being grounded. A resistor 128 is connected across the transformer coil 118.

In the operation of the receiver the switch 64 is first closed applying operating voltages to the various components. When the set has had sufficient time to warm up, the operator manually closes the push bar tuning switch 35. This completes an energizing circuit for coil 15 as follows: switch 64, line 66, line 72, line 76, auxiliary winding 78, winding 15, line 32, contact 34, arm 36 to ground. This energizes both coils 15 and 78 and armatures 18 and 16 are attracted or moved toward the left as shown in the figure to close with stationary contacts 20 and 42 respectively. The closure of armature 16 with contact 42 completes the trigger energizing circuit in block 2 and the operator can then remove pressure from the switch 35 and allow it to open, an energizing circuit being completed within the set to maintain relay coil 15 energized which will not be broken until a signal is tuned in. At the same time, movement of the armature 16 away from stationary contact 40 opens that circuit inserting the sensitivity control section in the cathode string of the amplifier so that the setting of the switch arm 50 now determines the sensitivity of the set and therefore whether it will be indexed by only strong or also by weak signals. Movement of the armature 18 mechanically releases the spring drive motor 6 so that it may now drive the tuning means through the clutch 11 and it proceeds to do so tuning the receiver over the band.

Movement of the armature 18 to engage contact 20 completes circuits to both windings 14 and 10 but these coils will not be energized unless the limit switches 24 and 28 associated with each are also closed. The tuner thus proceeds until a signal is encountered at which time the relay winding 15 is deenergized through control in the trigger circuit and armatures 16 and 18 drop back to mechanically index the tuner and to also switch the sensitivity of the amplifier back to listening sensitivity. If during the tuning phase of the cycle the tuner and treadle bar reaches one extreme position so that the spring motor cannot drive it further, limit switch 24 is closed to energize solenoid winding 14 and its action quickly moves the treadle bar and associated tuner back to the opposite extreme position where tuning in the original direction can continue. On the other hand if during the tuning phase of the cycle the spring motor runs down, limit switch 28 will be closed to energize solenoid winding 10 and the cocking solenoid 8 will quickly charge the spring motor to repower the same. It is to be noted that auxiliary winding 78 is in circuit with both of the solenoid windings 10 and 14 through the following circuit: from the power line 66, line 72, line 76, auxiliary winding 78, line 30, armature 18, contact 20, line 22, winding 14, limit switch 24 to ground and alternately, line 22, line 26, winding 10 and limit switch 28 to ground. Thus, when either one of the solenoids is energized, an additional current flows through winding 78 to help hold armatures 16 and 18 in their attracted position so they do not chatter. When either manual means or mechanical preset push button means are operated to tune the receiver, the clutch 11 is opened and the spring motor means detached from the tuner and treadle bar. The treadle bar is, of course, moved at any time that the tuning means moves.

In the final audio output stage which drives the loud speaker 112, condenser 100 is connected directly between emitter electrode 86 of the transistor 4 and the secondary winding 96. This provides a direct capacity coupling between the two in shunt with the resistance coupling provided by the resistors 80 and 88. The use of a condenser in this position tends to stabilize and increase the output of this stage.

I claim:

1. In radio receiving apparatus, movable means for tuning the apparatus over a predetermined band of frequencies, power storage means, clutch means for coupling said movable tuning means to said power storage means to drive the movable tuning means in one direction over the frequency band, solenoid means connected to the power storage means to charge the same, indexing means operable upon the receipt of an incoming signal to stop the movable tuning means when a station is tuned in, said indexing means including a relay coil and armature, and an auxiliary winding on said relay coil connected in circuit with said relay coil and also with said solenoid means and energized with either the solenoid means connected to the power storage means or the indexing means relay coil or both to assist the relay winding and prevent armature chatter.

2. In radio receiving apparatus, movable means for tuning the apparatus over a predetermined band of frequencies, power storage means, clutch means for coupling said movable tuning means to said power storage means to drive the movable tuning means in one direction over the frequency band, solenoid means connected to the power storage means to charge the same, a second solenoid means connected to the movable tuning means to independently move the tuning means to one extreme position, indexing means operable upon receipt of an incoming signal to stop the movable tuning means when a station is tuned in, said indexing means including a relay coil and an armature, and an auxiliary coil on said relay connected in individual series circuits with each of the solenoids so that it is energized when any or all are energized to assist the relay coil and prevent armature chatter.

3. In radio receiving apparatus, movable tuning means for tuning said receiving apparatus over a predetermined band of frequencies, electromechanical driving means connected to the movable tuning means for moving the same, indexing means operable upon receipt of an incoming signal to stop said movable tuning means, said indexing means including a relay coil and armature and auxiliary coil means on said relay coil connected in series circuit with said electro-mechanical driving means and electrically energized at any time the electro-magnetic means is to provide additional force to prevent armature chatter when said electro-mechanical driving means is energized.

4. In radio receiving apparatus, movable tuning means for tuning said receiving apparatus over a predetermined band of frequencies, electro-mechanical driving means connected to the movable tuning means for moving the same, indexing means operable upon receipt of an incoming signal to stop said movable tuning means, said indexing means including a relay coil and armature, auxiliary coil means on said relay coil connected in series circuit with said electro-mechanical driving means and electrically energized at any time that the electromagnetic means is to provide additional force to prevent armature chatter when said electro-mechanical driving means is energized, a loud speaker, a transistor having base, emitter and collector electrodes, said loud speaker being electrically connected between the collector and emitter electrodes, conductive means connecting the output of the apparatus which is tuned to the base and emitter electrodes, biasing means connected between the conductive means and emitter electrode and a condenser connected directly between the conductive means and the emitter electrode in shunt to the biasing means to increase the output of the transistor stage.

References Cited in the file of this patent

UNITED STATES PATENTS

| | | |
|---|---|---|
| 2,200,128 | West | May 7, 1940 |
| 2,541,018 | Andrews | Feb. 13, 1951 |
| 2,571,803 | Winter | Oct. 16, 1951 |
| 2,680,160 | Yaeger | June 1, 1954 |
| 2,706,787 | Sperber | Apr. 19, 1955 |
| 2,811,590 | Doremus et al. | Oct. 29, 1957 |
| 2,852,944 | Gaskill | Sept. 23, 1958 |